United States Patent [19]
Ausdenmoore et al.

[11] Patent Number: 5,484,105
[45] Date of Patent: Jan. 16, 1996

[54] COOLING SYSTEM FOR A DIVERGENT SECTION OF A NOZZLE

[75] Inventors: Robert M. Ausdenmoore, West Chester, Ohio; Wilbert B. Freid, Bridgton, Me.

[73] Assignee: General Electric Company, Cincinnati, Ohio

[21] Appl. No.: 274,523

[22] Filed: Jul. 13, 1994

[51] Int. Cl.⁶ .................................................. B64D 33/04
[52] U.S. Cl. ........................................ 239/127.3; 60/271
[58] Field of Search .......................... 239/127.1, 127.3, 239/265.17, 265.23, 265.33–265.41; 60/230, 271; 244/52, 73 R, 73 B

[56] References Cited

U.S. PATENT DOCUMENTS

| | | |
|---|---|---|
| 2,989,845 | 6/1961 | Howald . |
| 3,048,971 | 8/1962 | Alford . |
| 3,049,873 | 8/1962 | Weeks, Jr. ............................ 239/127.3 |
| 3,054,256 | 9/1962 | Minos . |
| 3,062,003 | 11/1962 | Hamilton ............................ 239/127.3 |
| 3,231,197 | 1/1966 | Strom . |
| 3,612,400 | 10/1971 | Johnson et al. . |
| 3,650,348 | 3/1972 | Colebrook et al. . |
| 3,972,475 | 8/1976 | Nelson ................................ 239/127.3 |
| 4,128,208 | 12/1978 | Ryan et al. ........................ 239/265.39 |
| 4,245,787 | 1/1981 | Freid . |
| 4,355,507 | 10/1982 | Coffey et al. . |
| 4,420,932 | 12/1983 | Mendez et al. . |
| 4,440,346 | 4/1984 | Wiley . |
| 4,544,098 | 10/1985 | Warburton .......................... 239/127.3 |
| 4,690,330 | 9/1987 | Robinson et al. . |
| 4,994,660 | 2/1991 | Hauer ................................. 239/265.41 |
| 5,000,386 | 3/1991 | Lybarger ............................ 239/265.39 |
| 5,039,014 | 8/1991 | Lippmeier .......................... 239/265.39 |
| 5,056,307 | 10/1991 | Liang . |
| 5,076,496 | 12/1991 | Lippmeier .......................... 239/265.41 |
| 5,082,182 | 1/1992 | Bruchez, Jr. et al. . |
| 5,111,992 | 5/1992 | Barcza ................................ 239/127.3 |
| 5,120,005 | 6/1992 | Reedy . |
| 5,141,154 | 8/1992 | Barcza ................................ 239/127.3 |
| 5,174,502 | 12/1992 | Lippmeier et al. ................ 239/265.41 |
| 5,215,256 | 6/1993 | Barcza ................................ 239/265.39 |
| 5,215,257 | 6/1993 | Barcza ................................ 239/265.39 |
| 5,238,189 | 8/1993 | Barcza . |
| 5,269,467 | 12/1993 | Williams et al. .................. 239/265.41 |
| 5,285,637 | 2/1994 | Barcza ..................................... 60/230 |

Primary Examiner—Karen B. Merritt
Attorney, Agent, or Firm—Andrew C. Hess; Wayne O. Traynham

[57] ABSTRACT

A nozzle cooling system having apparatus to overexpand the exhaust flow in a divergent section of an aircraft gas turbine engine nozzle, relative to the air in the engine nozzle's bay and a valve to allow ambient air from the bay to flow over divergent flaps and seals of the divergent section, and rapidly cool the divergent section of the nozzle for IR suppression. An area ratio control apparatus may be used to change a ratio of the nozzle exit area to the nozzle throat area to an overexpanded level that reduces static pressures along at least a longitudinally extending portion of the surfaces to below the ambient pressure of air outside the nozzle to draw the ambient air into the exhaust gas flowpath, and a valve apparatus to controllably flow the ambient air into the exhaust gas flowpath when the static pressures are below the ambient pressure. Further embodiments of the present invention provide alternative area ratio control apparatus, such as a variable exit area control apparatus to vary the exit area or a variable throat area control apparatus to vary the throat area, or both. Valve apparatus with a gap apparatus to controllably open gaps between the circumferentially adjacent divergent flaps and seals are provided such as spring loaded divergent seal retainers and flapper valves sealingly disposed over corresponding cooling apertures through the divergent seals.

17 Claims, 7 Drawing Sheets

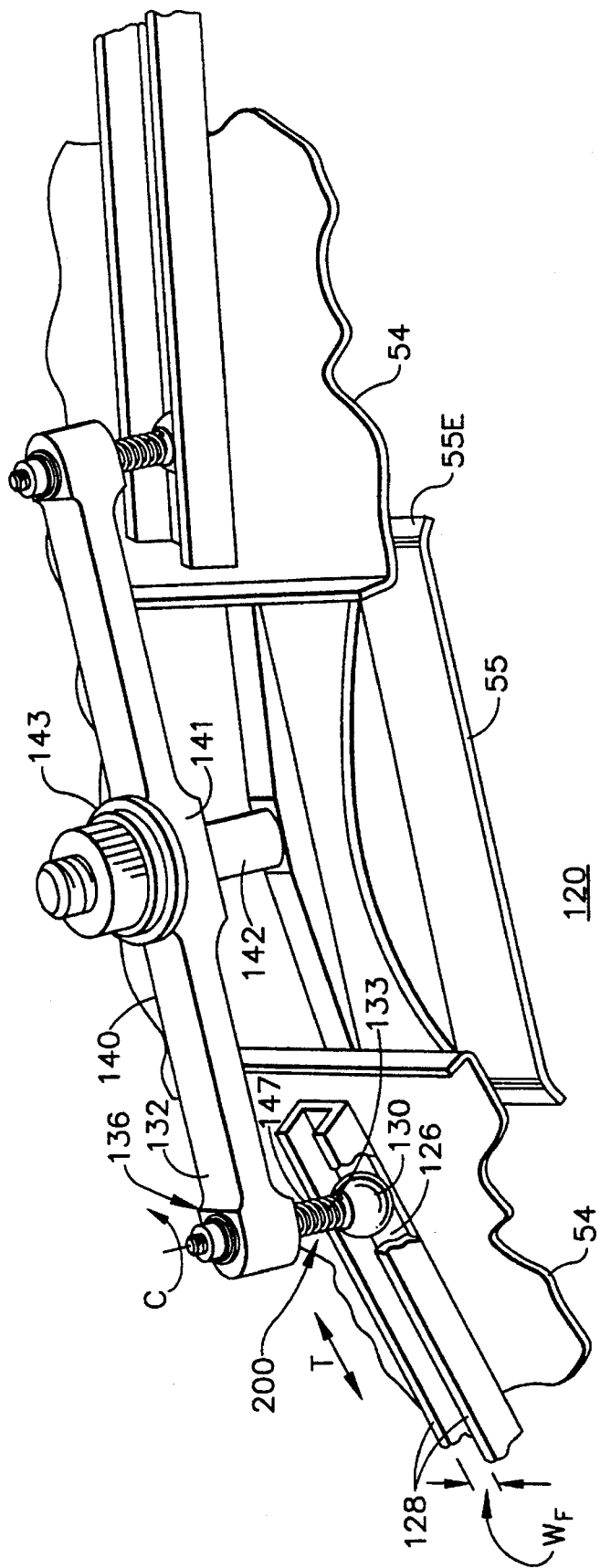

COOLING SYSTEM FOR A DIVERGENT SECTION OF A NOZZLE

BACKGROUND OF THE INVENTION

1. Field of the Invention

The present invention relates generally to gas turbine engine nozzles and, more particularly, to a divergent section of a nozzle and its cooling means to reduce the engine's infrared signature.

2. Discussion of the Background Art

Hot nozzles emit infrared radiation (IR) which is highly undesirable for military combat aircraft. Infrared radiation from gas turbine engines is conventionally suppressed by shielding and cooling the hot metal structures of the engine. The use of outer flaps and seals around the divergent section of variable nozzles is demonstrated in U.S. Pat. No. 4,128,208, by Ryan et al., entitled "Exhaust Nozzle Flap Seal Arrangement", assigned to the same assignee as the present invention. Nozzles also require cooling for structural reasons. Cooling air is conventionally drawn from the fan section or a compressor section of the gas turbine engine which is expensive in terms of fuel and power consumption. Ejecting nozzles such as the type used on some General Electric J79 engine models have employed slot type ejectors to induct ambient cooling air from the atmosphere to supplement the engine supplied cooling air in order to reduce the use of the more expensive engine air. Such ejecting nozzles provided efficient cooling for variable nozzle throats but are not as effective for cooling thrust vectoring nozzles such as axisymmetric vectoring exhaust nozzles which have 2 DOF pivoting flaps and seals. U.S. patent application Ser. No. 07/700,979, entitled "AXISYMMETRIC VECTORING EXHAUST NOZZLE THERMAL SHIELD", disclosed a shielding means and a nozzle cooling means for axisymmetric vectoring nozzles to efficiently cool the nozzle and shield it from emitting infrared radiation. However, faster cooling means are required when an emergency situation occurs while the nozzle is operating hot.

One type of conventional gas turbine engine exhaust nozzle includes primary and secondary exhaust flaps arranged for defining a variable area convergent-divergent exhaust nozzle. The exhaust nozzle is generally axisymmetric, or annular, and exhaust flow is confined by the primary or convergent flaps and secondary or divergent flaps being positioned circumferentially adjacent to each other, respectively.

The divergent flaps, for example, have a forward end defining a throat of minimum flow area and an aft end having a larger flow area for defining a diverging nozzle extending downstream from the throat. The divergent flaps are variable, which means that the spacing between the divergent flaps as they are moved from a smaller radius position to a larger radius position must necessarily increase. Accordingly, conventional exhaust nozzle seals are suitably secured between adjacent divergent flaps to confine the exhaust flow and prevent leakage of exhaust flow between the divergent flaps.

An advanced axisymmetric vectoring nozzle has been developed and patented in U.S. Pat. No. 4,994,660, entitled "AXISYMMETRIC VECTORING EXHAUST NOZZLE", by Hauer, assigned to the present assignee, and herein incorporated by reference. An axisymmetric vectoring nozzle provides a means for vectoring the thrust of an axisymmetric convergent/divergent nozzle by universally pivoting the divergent or divergent flaps of the nozzle in an asymmetric fashion or in other words pivoting the divergent flaps in radial and tangential directions with respect to the unvectored nozzle centerline.

Vectoring nozzles, and in particular axisymmetric vectoring exhaust nozzles of the type disclosed in the Hauer reference, provide positionable divergent flaps. These divergent flaps are positionable not only symmetrically, relative to a longitudinal centerline of the exhaust nozzle, but may also are positionable asymmetrically relative thereto for obtaining pitch and yaw vectoring. An exemplary thrust vectoring nozzle uses three vectoring actuators to translate and tilt a vectoring ring which in turn forces the divergent flaps in predetermined positions. The vectoring ring tilt angle and tilt direction establish the nozzle's vector angle and vector direction, respectively. Axial translation of the vectoring ring establishes the exit area (often referred to as A9) for a given throat area (often referred to as A8).

Retaining the flaps and adjacent seals in place for an axisymmetric nozzle is very difficult because of the varying degree of askewness between the flaps and seals encountered during asymmetric operation of the nozzle for thrust vectoring. The seal has to be retained radially, with respect to the nozzle's centerline, and circumferentially to prevent the flap seals from becoming unfeathered from the adjacent flaps. Radial retention means between seals and flaps is disclosed in U.S. Pat. No. 5,269,467, entitled "Vectoring Exhaust Nozzle Seal and Flap Retaining Apparatus", and was developed to counteract the inverse exhaust pressures that occur when there is higher pressure on the radially outer surfaces of the seal and flap than on the radially inner surfaces.

Modern multi-mission aircraft application employ engines, such as the GE F110 engine, with convergent/divergent nozzles to meet operational requirements. Convergent/divergent nozzles have, in serial flow relationship, a convergent section, a throat, and a divergent section. Characteristically, these nozzles employ variable area means at both the nozzle throat and at the nozzle exit. This provides a means to maintain a desired exit to throat area ratio which in turn allows efficient control over the operation of the nozzle. The operation of the nozzle is designed to provide a nozzle exit/throat area (A9/A8) schedule which is optimized for the design cycle of the engine and ideally should provide efficient control at both low subsonic and high supersonic flight conditions. These types of nozzles typically use pneumatic or hydraulic actuators to provide the variable operation. Typically, the exit and throat areas are mechanically coupled to each other in such a manner as to create an area ratio (A9/A8) schedule which is a function of nozzle throat area (A8). The area ratio schedule is typically predetermined to provide efficient engine operation across a wide range of engine conditions but typically optimum performance at specific engine conditions is compromised somewhat in order to provide adequate efficiency throughout the range of engine operation. Thrust vectoring nozzles typically have the ability to independently control nozzle exit area and throat area which allows the engine to achieve a higher level of performance across a wide range of engine operating conditions. An additional benefit of independent throat and exit area control is the capability to overexpand the nozzle divergent system beyond its optimal performance area ratio to create divergent system static wall pressure lower than ambient pressures to thereby pull the lower temperature ambient air into the nozzle where it can be used to cool the divergent system components. Ambient pressures, as with all ambient conditions, refer to freestream conditions outside the aircraft. Ambient conditions are also generally found in unpressurized nozzle bays, i.e. the area surrounding the convergent and divergent flaps that lie inside outer flaps or engine or other casings surrounding the nozzle flaps.

The successful operation of combat aircraft is dependent, in part, upon the ability of the aircraft to remain undetected by infrared sensors of various ground and air based weapon systems, such as ground and air launched missiles, during flight. The high temperatures of the engine's exhaust gases and the hot metal turbine parts and the hot metal walls directly in contact with the hot gases cause the engine to emit high levels of infrared energy. Military aircraft engaged in combat are vulnerable to anti-aircraft missiles employing highly sophisticated infrared sensors.

A number of apparatus have been designed to reduce infrared emissions from gas turbine engines. Each type of design endeavors to provide a combination of aerodynamics, heat transfer, and geometry which will result in an effective IR suppressor for the least suppressor weight and power effects on a turbine engine. One of these types of geometries utilizes a concentric centerbody within an annular duct. This suppressor geometry is referred to as a plug or centerbody suppressor and exemplified by U.S. Pat. Nos. 4,214,441, 4,044,555, 3,970,252 and the like. The plug suppressors are supported and fed cooling air from fan and/or high pressure bleed air aerodynamically shaped struts which are also used to position and support the centerbody. These hollow centerbody plug suppressors consume expensive fan and compressor air engine and power and result in reduced engine efficiency and combat operating radius.

There exists a need for a means to provide rapid emergency mode cooling of the interior hot surfaces of the divergent section of the nozzle to rapidly suppress the engine's IR signature during combat missions with a minimal adverse effect on the overall operability of the aircraft and its engine.

SUMMARY OF THE INVENTION

Briefly, in accordance with one aspect of the present invention, a nozzle cooling system having a means to overexpand the exhaust flow in a divergent section of the nozzle relative to the air in the engine nozzle bay and a valve means to allow ambient air from the bay to flow over divergent flaps and seals of the divergent section and rapidly cool the divergent section of the nozzle for IR suppression. The present invention also includes a method by which ambient air is drawn into an overexpanded nozzle from the nozzle bay and through a valve means to cool divergent system components subject to IR detection.

One embodiment of the present invention provides a cooling system for cooling interior hot surfaces of longitudinally extending and circumferentially adjacent divergent seals and flaps bounding a hot exhaust gas flowpath in a divergent section of an aircraft gas turbine engine exhaust nozzle having a nozzle throat area and a nozzle exit area of the nozzle, an area ratio control means to change the ratio of the nozzle exit area to the nozzle throat area to an overexpanded level that reduces static pressures along at least a longitudinally extending portion of the surfaces to below the ambient pressure of air outside the nozzle to draw the ambient air into the exhaust gas flowpath, and a valve means to controllably flow the ambient air into the exhaust gas flowpath when the static pressures are below the ambient pressure.

Further embodiments of the present invention provide alternative area ratio control means such as a variable exit area control means to vary the exit area or a variable throat area control means to vary the throat area, or both. Another embodiment of the present invention provides the valve means with a gap means to controllably open gaps between the circumferentially adjacent divergent flaps and seals. A more specific embodiment of the present invention provides the gap means with a spring loaded divergent seal retainer. And another embodiment provides the valve means with flapper valves sealingly disposed over corresponding cooling apertures through the divergent seals.

The present invention provides advantages over present nozzle designs by providing the capability of quickly reducing infrared signature emission from divergent exhaust nozzle components by quickly reducing operating temperatures, thus resulting in improved survivability of the aircraft during combat conditions. Another advantage provided by the present invention is increased divergent flow stability at low nozzle pressure ratios and high vector angles due to entrainment of ambient air in the exhaust gas flowpath during such emergency combat maneuvers. The present invention also has a weight advantage and a cost advantage over other nozzle cooling systems for reducing IR signatures. The cost advantage is enhanced due to fewer required parts to duct air and or seal the exhaust nozzle cavity and includes lower maintenance costs as well as design, development, and manufacturing costs. Another advantage of the present invention is a reduced likelihood of an engine bay fire due to positive sealing of exhaust gas from the exhaust cavity (and subsequently the engine bay) during all potential backflow conditions.

BRIEF DESCRIPTION OF THE DRAWING

The novel features believed characteristic of the present invention are set forth and differentiated in the claims. The invention, together with further objects and advantages thereof, is more particularly described in conjunction with the accompanying drawing in which:

FIG. 3A is a fragmentary perspective view of an alternate coil spring loaded divergent forward seal retainer in accordance with an alternative embodiment of the seal retainer illustrated in FIG. 3.

DETAILED DESCRIPTION

Figure 1:
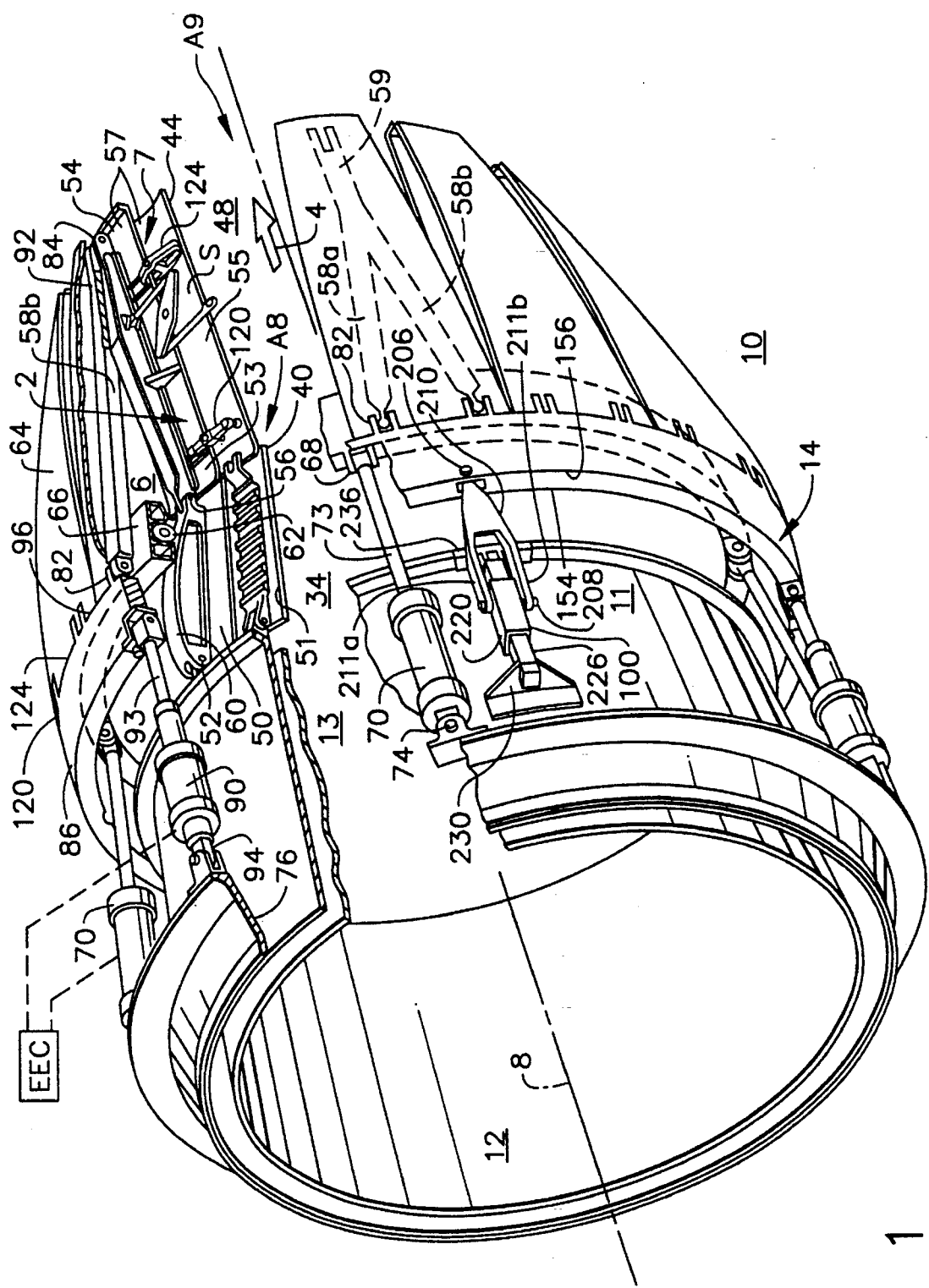
FIG. 1 is a perspective view of an axisymmetric vectoring exhaust nozzle having a cooling system for a divergent section of the nozzle in accordance with one embodiment of the present invention.

An embodiment of the present invention is illustrated in FIG. 1 as a nozzle cooling system generally shown at 2 for an axisymmetric thrust vectoring nozzle 14 in an exhaust section 10 of an aircraft gas turbine engine (not shown in its entirety. The nozzle cooling system 2 has a means to overexpand an exhaust flow 4 in a divergent section 48 of the nozzle 14 relative to the air in an engine nozzle bay 6 which is at approximately ambient conditions. A valve means generally indicated at 7 allow ambient air from the bay 6 to flow over the backs 57 and over longitudinally extending interior hot surfaces S of divergent flaps 54 and seals 55 in the divergent section 48 and rapidly cool the divergent section of the nozzle 14 for IR suppression. The exhaust section 10 comprises, in serial flow relationship, a fixed area duct or engine casing 11, including an afterburner liner 12, and a variable area downstream section 13 of the axisymmetric thrust vectoring nozzle 14 of the convergent/divergent type as referenced previously in the Hauer patent. Referring to FIG. 1, nozzle 14 comprises in serial flow relationship a convergent section 34, a throat 40 and the divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. The divergent flap 54 is pivotally attached at its forward end 53 to the aft end of the primary flap 50 by a universal two degree of freedom (2 DOF) joint means 56 generally at an axial position in the nozzle 14 which coincides with throat 40. Divergent flaps 54 are generally circumferentially disposed about engine centerline 8 with overlapping divergent or divergent seals 55 disposed between and in sealing engagement with the radially inward facing surface of circumferentially adjacent divergent flaps 54. The divergent seals 55 are designed to seal against the divergent flaps 54 during nozzle operation when the nozzle pressure, the pressure radially inward of the flaps and seals, is normally greater than the pressure outside the nozzle, typically ambient air or nozzle bay pressure. Throat 40 has associated with it a throat area conventionally denoted as A8 and the nozzle exit 44 is generally at the end of divergent flaps 54 and has an exit area associated with it conventionally denoted as A9.

A plurality of cam rollers 62 are disposed in a primary ring 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and divergent flaps 54 radially outward thus keeping cam surface 60 in contact with one of the cam rollers 62. A conical annular actuator support 76 is mounted at its narrow forward end to engine casing 11 and primary actuator 70 is pivotally connected to the wide aft end of the actuator support 76 by a universal ball joint 74. Primary actuator 70 has an actuator rod 73 which in turn is connected to primary ring 66 by a spherical joint 68.

A plurality of vectoring actuators 90, of which there are three in the preferred embodiment, are equi-angularly disposed circumferentially around casing 11 and mounted to actuator support 76 by universal ball joints 94 in a similar manner as actuators 70. An actuating ring 86 is connected to vectoring actuators 90 at the aft end of a vectoring actuator rod 93 by a spherical joint 96. This provides for actuating ring 86 to be axially translated and tilted about centerline 8 in order to control its attitude. Actuating ring 86 controls the positioning or pivoting of divergent flaps 54. Divergent flap 54 is pivotally connected to primary flap 50 by a 2 DOF universal joint means 56 and is pivotally controlled in a multi-degree of freedom manner by a plurality of respective Y-frames 59 having control arms 58a and 58b that operably connect secondary actuating ring 86 to divergent flap 54. Outer flaps 64 are at least partially supported by Y-frames 59 and provide a clean and smooth aerodynamic shape along the exterior of the nozzle.

Control arms 58a and 58b are connected to actuating ring 86 by 3 DOF spherical joints 82 and to the aft end of divergent flap 54 by a spherical joint 84. This linkage is operable to translate an attitude change of actuating ring 86 into a multi-degree of freedom pivoting change or orbital movement of divergent flap 54 whereby each divergent flap may be pivoted through a different angle. The use of spherical joints 82 to attach control arms 58a and 58b provides clevis type pivoting of Y-frame 59 while preventing any twisting loads that may be imparted to either control arms 58a or 58b from being transferred back to actuating ring 86. Backbone 92 provides a mount for divergent flap 54 and support for joints 84 and 56 at its two ends.

Actuating ring 86 is supported by three axially adjustable actuating ring support means 100, equi-angularly disposed circumferentially about casing 11, that allows actuating ring 86 to be axially translated and gimballed by vectoring actuators 90. An axially translating A-frame 210 supports actuating ring 86 by a 3 DOF spherical joint 206. The A-frame 210 is pivotally attached to the slider 220 with a clevis type hinge means 208 in the form of spherical joints at the ends of arms 211a and 211b. The use of spherical joints at the ends of arms 211a and 211b provide clevis type pivoting for A-frame 210 and also eliminate the transfer of twisting loads that may be imparted to the arms. The slider 220 is slidable along a hollow slider bar 226 that is attached to engine casing 11 by forward bracket 230 and an aft bracket 236. The slider 220 is slidable along a hollow slider bar 226 that is attached to the engine casing 11 by a forward bracket 230 and an aft bracket 236. The actuating ring support means 100 permits the actuating ring 86 to translate axially forward and rearward and tilt so as to change its attitude. A more detailed description of the actuating ring support means 100 may be found in U.S. Pat. No. 5,174,502, by Lippmeier et al., entitled "Support for a Translating Nozzle Vectoring Ring", herein incorporated by reference.

Thrust vectoring nozzles vector thrust by positioning the divergent flaps 54 and seals 55 axisymmetrically relative to the centerline 8 therefore the radial and circumferential positions and attitude of the divergent flaps and seals. The actuating vectoring ring 86 is translated and gimballed about nozzle centerline 8 by at least 3 vectoring actuators 90 and which are also used to translate the vectoring ring to accommodate and/or control the variable exit area A9 and set the exit area to throat area ratio A9/A8. The variable throat area A8 may be independently set by translation of the primary ring 66 by the primary actuators 70 to set the exit area to throat area ratio A9/A8. Alternatively, both sets of actuators and rings may be used in combination to set the exit area to throat area ratio A9/A8.

This area ratio control means to change a ratio of the nozzle exit area to the nozzle throat area to adapted in the present invention to allow an overexpanded exit area to throat area ratio A9/A8 level that reduces static pressures along at least a portion of the longitudinally extending interior hot surfaces S of the divergent seals 55 and flaps 54 to below the ambient pressure of air outside the nozzle to draw the ambient air into the exhaust gas flowpath. This can be accomplished by varying the throat area A8 or the exit area A9, or preferably both. The area ratio control means is best provided for by adapting the electronic engine control EEC to receive a signal from the pilot or some other source to automatically configure the exhaust nozzle for the overexpanded mode of operation according to predetermined schedule stored in the EEC and preferably based on engine and aircraft operating conditions. The area ratio schedule would be controlled to a more efficient, lower drag configuration during a more normal or non emergency mode of operation when an overexpanded nozzle is not as advantageous.

Figure 2:
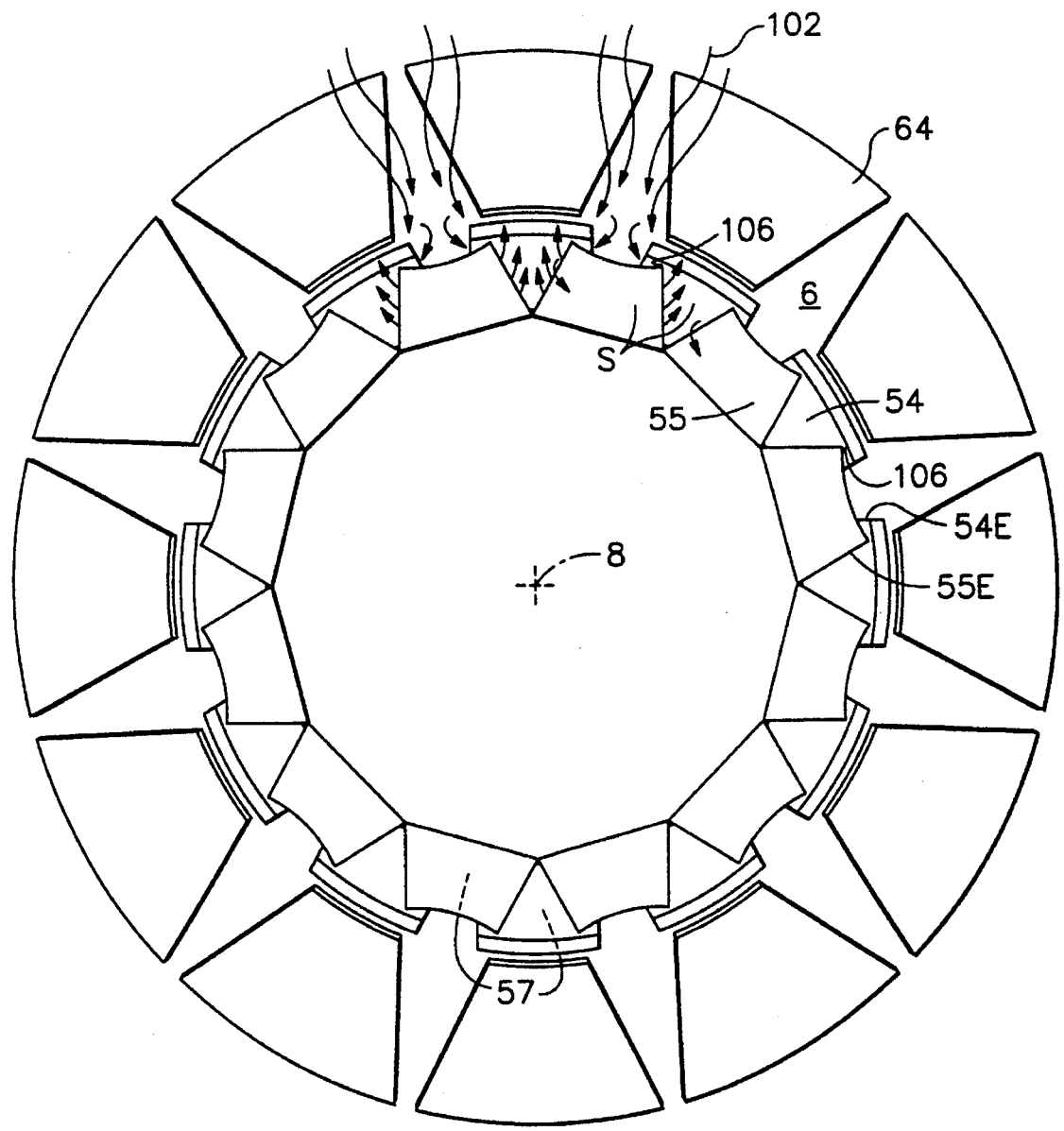
FIG. 2 is an aft looking forward view schematic view of the vectoring exhaust nozzle and a cooling system in FIG. 1.

Illustrated in FIG. 2 is an exemplary first embodiment of the valve 7 in FIG. 1. Cooling air 102 is drawn around the outer flaps 64 into the nozzle bay 6 and through a gap 106 between adjacent divergent flaps 54 and seals 55 which are normally disposed in overlapping sealing relationship about the unvectored nozzle centerline which coincides with engine centerline 8. The seals 55 are disposed radially inward of the adjacent flaps 54 and designed to seal against the flaps during normal nozzle operation when the nozzle pressure, the pressure radially inward of the flaps 54 and seals 55, is normally greater than the pressure in the nozzle bay 6. During the overexpanded mode of the nozzle the pressure gradient would reverse causing the seals 55 to open up a gap 106 between adjacent divergent flaps 54 and seals 55 to allow the cooling or ambient air to flow from the air outside the engine between the outer flaps 64 into the nozzle bay 6 through the gap 106 which convectively cools the backs 57 of the flaps and seals. This cooling flow could also provide a film of relatively cool air on the flowpath interior hot surfaces S of the divergent flaps 54 and seals 55. One or both of these cooling flows are able to cause rapid cooling of the divergent section 48 and would result in a lower infrared signature emitted from the nozzle 14. The size of the gaps 106 between the adjacent divergent flaps 54 and seals 55 may be designed to some extent by incorporating an elastically compliant material or structure for the divergent flaps and seals to their respective flap edges 54E and seal edges 55E.

Figure 3:
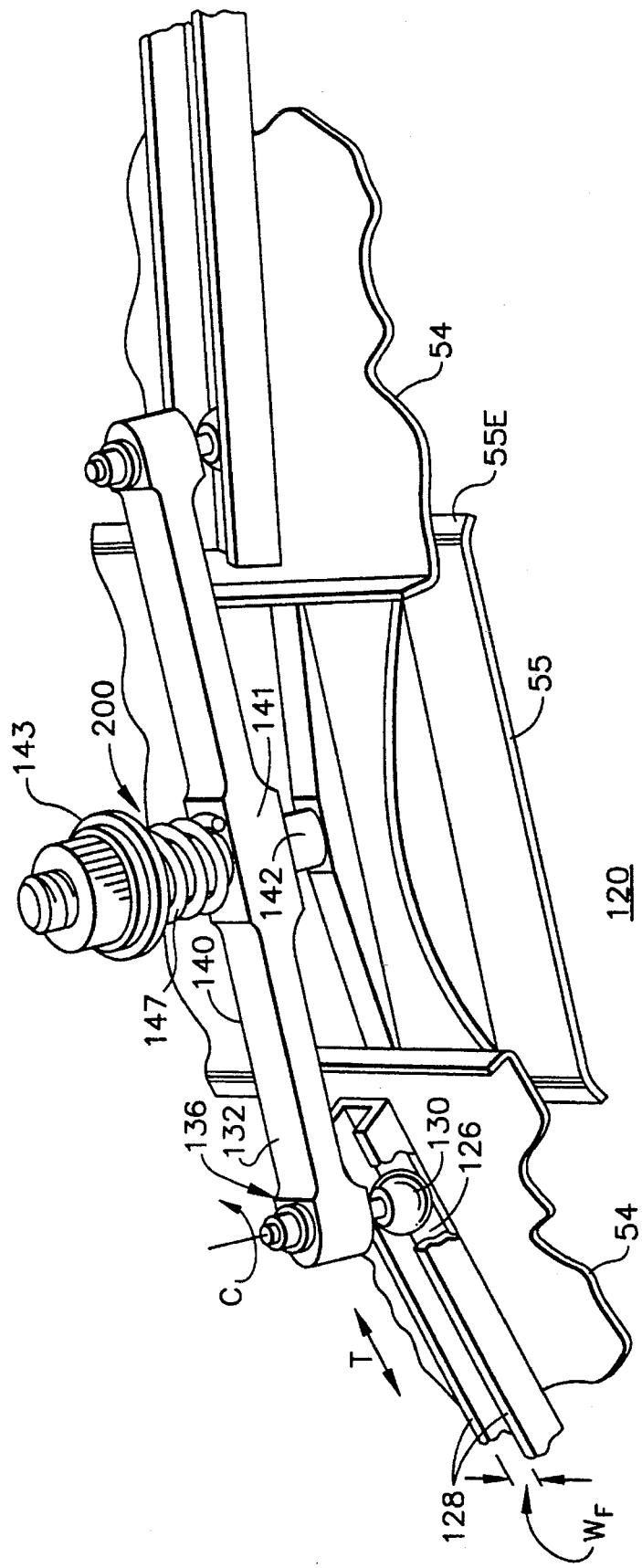
FIG. 3 is a fragmentary perspective view of a coil spring loaded divergent forward seal retainer in accordance with a first alternative embodiment of the valve and gap means of the present invention.
Figure 4:
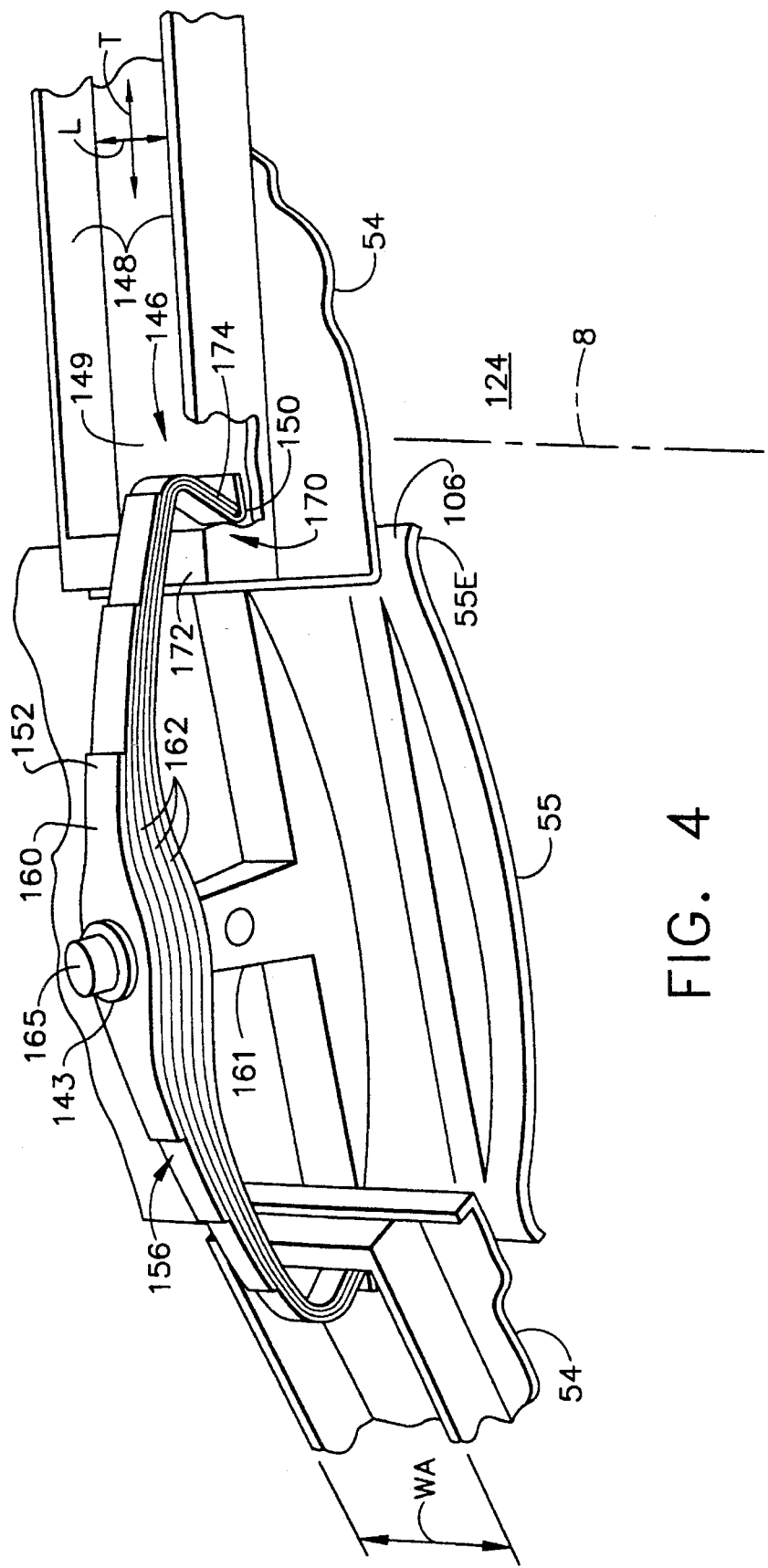
FIG. 4 is a fragmentary perspective view of a leaf spring loaded divergent aft seal retainer in accordance with a second alternative embodiment of the valve and gap means of the present invention.

A more controlled means of opening the gap 106 between the divergent flap 54 and seal 55 provides a spring means illustrated as a spring loaded divergent forward seal retaining means 120 and a spring loaded divergent aft seal retaining means 124 in FIGS. 1, 3 and 4. The nozzle 14 vectors thrust by positioning the divergent flaps 54 and seals 55 axisymmetrically relative to the centerline 8; 10 therefore, the radial and circumferential positions and attitude and to this end the spring loaded forward and aft retaining means 120 and 124, respectively, are provided to retain the seal 55 against the flap 54 during reverse pressure gradients as described earlier. These are similar to the seal to flap retaining means disclosed in U.S. Pat. No. 5,269,467.

FIG. 3 illustrates, in more detail, the forward retaining means 120 having a transversely extending forward channel 126 including forward channel walls 128 mounted on the back of the flap 54. A spherically shaped forward retaining lug 130 is supported from the seal 55 at the end of a forward arm 132 and is movably disposed within the forward channel 126. A forward positioning means 136 is provided to help position adjacent flaps 54 and seals 55 by positioning the forward retaining lug 130 within the forward channel 126 when the adjacent seal 55 and flap 54 are moved and in particular when their attitudes with respect to each other is change during thrust vectoring. The present invention further incorporates a compressive coil spring means 200 to provide the spring loading function for the forward seal retaining means 120. The compressive coil spring means 200 places seals 55 in compressive sealing engagement with adjacent flaps and is sized to allow the divergent seal edges 55E to disengage from the divergent flaps due to force balance during the overexpanded condition and also ensure that the seals engage during other modes of operation.

The forward positioning means 136 provides a pivotal means for forward arm 132 and a narrow width WF of the forward channel 126 that restricts the movement of the forward retaining lug 130 and provides it with a two degree freedom (2 DOF) of motion, in the transverse direction indicated by arrow T and in a rotational direction C, within the forward channel 126. The design is simplified by providing a pivotable bar 140 having two forward arms 132 to provide positioning means 136 for two adjacent flaps. The pivotable bar 140 is pivotably mounted at its center 141 about a forward post 142 preferably cast with and radially extending outwards from a forward position of the back of seal 55. The pivotable bar 140 is secured onto the forward post 142 by a post cap shown as a threaded nut 143 which retains a coil spring 147 in compressive load against the pivotable bar 140.

The forward post 142 is preferably threaded at its top and a machined flange bushing is used to pivotably support pivotable bar 140 secured by the nut 143 on the threaded top of the forward post 142. The spherical shaped forward retaining lug 130 looks and operates somewhat like a trailer hitch ball. The lugs are necessary to maintain contact in the divergent flap forward channels when the exhaust nozzle is vectored.

FIG. 3A illustrates an alternative forward retaining means 120 having spring loaded spherically shaped forward retaining lugs 130, each of which is slideably mounted with respect to a forward arm 132 of the pivotable bar 140 by a shaft 133 which is slideably disposed within a hole (not shown) through the forward arm. The compressive coil spring means 200 is disposed around the shaft 133 between the forward retaining lug 130 and the forward arm 132. The compressive coil spring means 200 places seals 55 in compressive sealing engagement with adjacent flaps and is sized to allow the divergent seal edges 55E to disengage from the divergent flaps due to force balance during the overexpanded condition and also ensure that the seals engage during other modes of operation.

FIG. 4 illustrates, in more detail, the aft retaining means 124 having a transversely extending aft channel 146, including aft channel walls 148, that is mounted on the back of the flap 154. An aft retaining lug 150 is supported from the seal 55 at the end of an aft arm 152 and is movably disposed within the aft channel 146. An aft positioning means 156 is provided to help position adjacent flaps 54 and seals 55 by positioning the aft retaining lug 150 within the aft channel 146 when the adjacent seal 55 and flap 54 are moved and in particular when their attitudes with respect to each other is change during thrust vectoring. The aft retaining means 124 and in particular the aft arms 152 are constructed and formed as a compressive leaf spring 160 including individual leaves 162. Compressive leaf spring 160 is secured onto an aft post 161 by a post cap 165 shown as a threaded nut 143 which retains the compressive leaf spring in compressive against the base 149 of the aft channel 146.

The aft positioning means 156 provides a relatively wide width WA of aft channel 146 that permits 2 DOF movement of the aft retaining lug 150 with respect to the flap 54 in the transverse and longitudinal directions indicated by arrows labeled T and L within the aft channel 146. A hook means 170 at the lug supporting ends of aft arms 152 and the end of aft channel 146 provides a circumferential retention means, to prevent unfeathering between the seal 55 and the flap 54. The aft channel 146 is capped with a first hook 172 in the form of a circumferentially angled wall and the aft retaining lug 150 is circumferentially angled in the opposite direction to form a second hook 174 that is engageable with a the first hook 172.

Figure 5:
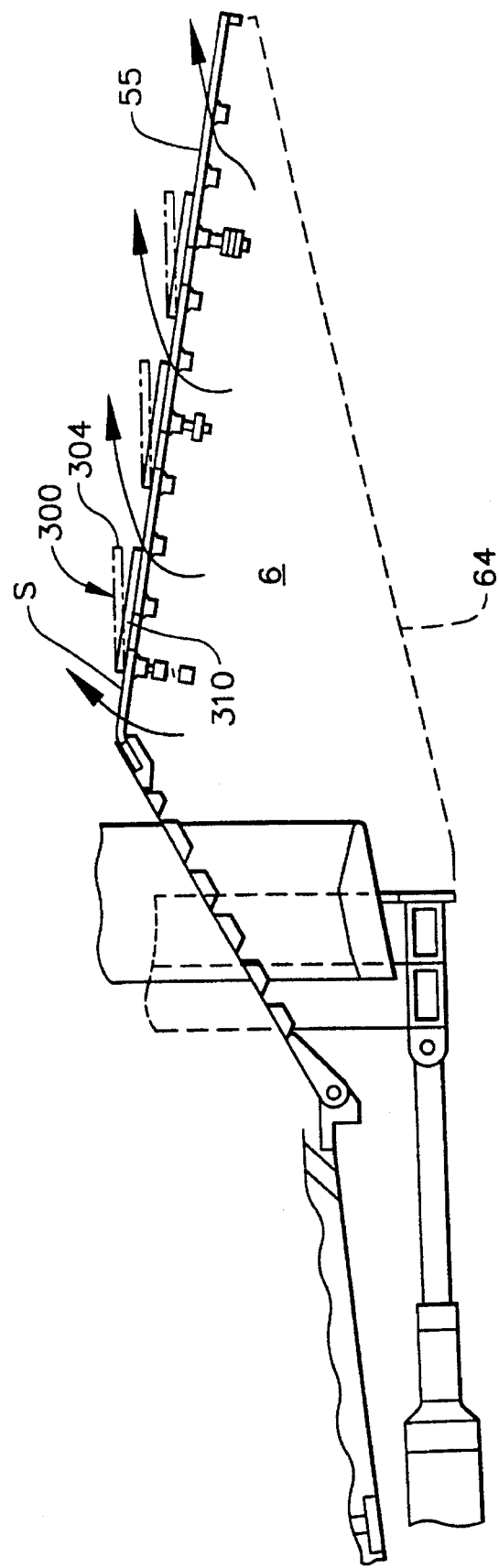
FIG. 5 is a cross-sectional side view of a flapper valve arrangement of the valve means in accordance with a another embodiment of the present invention.
Figure 6:
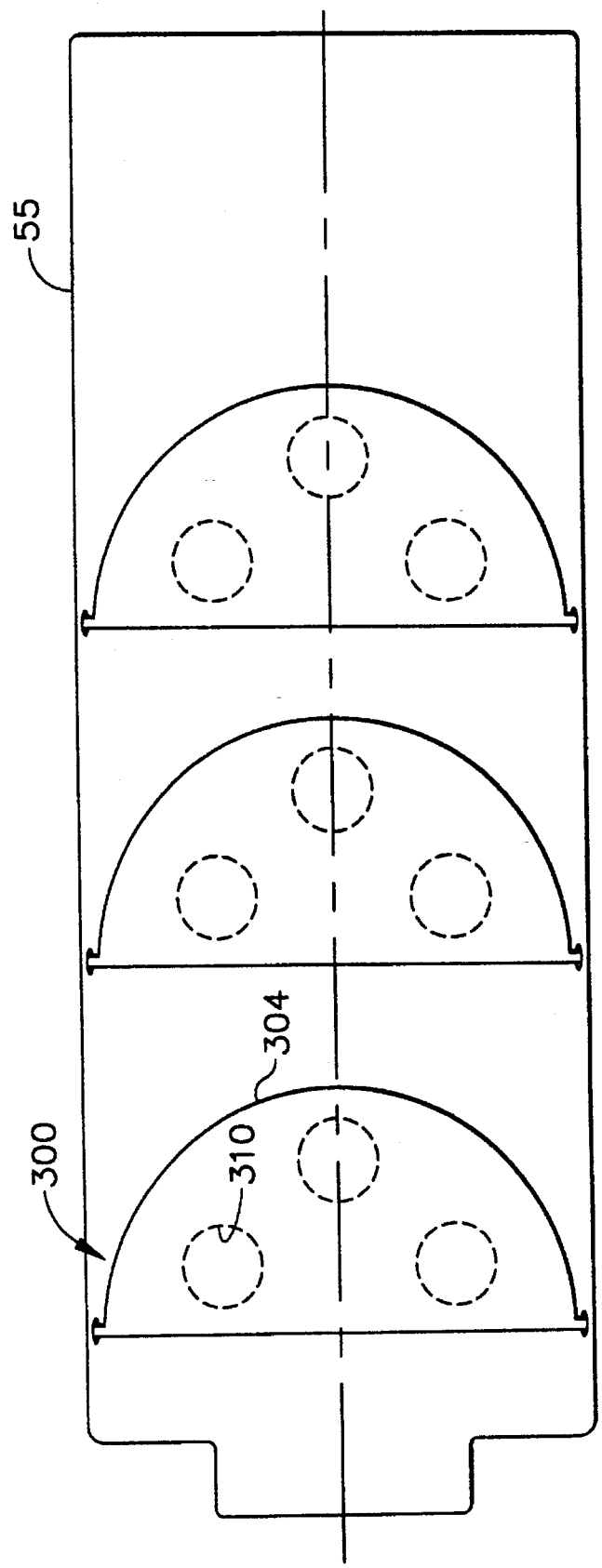
FIG. 6 is a side view looking radially outward of the divergent seal and flapper valve arrangement shown in FIG. 5.

FIGS. 5 and 6 illustrate another embodiment of the valve 7, mentioned earlier with reference FIG. 1, which has a plurality of flapper valves 300 on the hot surfaces S of the divergent seals 55 and provides flappers 304 disposed in sealing relationship over cooling apertures 310. The flappers 304 open and allow to flow from the air outside the engine between the outer flaps 64 (shown in FIG. 1) into the nozzle bay 6 through the apertures 310 and onto the interior hot surfaces S of the divergent seals 55 due to force balance during the overexpanded mode of operation thus allowing additional cool ambient air to be drawn into the exhaust flow as well. The flappers 304 remain closed due to force balance during the normal mode of operation.

While the preferred embodiment of our invention has been described fully in order to explain its principles, it is understood that various modifications or alterations may be made to the preferred embodiment without departing from the scope of the invention as set forth in the appended claims.

I claim:

1. A cooling system for cooling interior hot surfaces of longitudinally extending and circumferentially adjacent divergent seals and flaps bounding a hot exhaust gas flowpath in a divergent section of an aircraft gas turbine engine exhaust nozzle, said cooling system comprising:

a nozzle throat area and a nozzle exit area of the nozzle, an area ratio control means to change a ratio of said nozzle exit area to said nozzle throat area to an overexpanded level that reduces static pressures along at least a longitudinally extending portion of said surfaces to below ambient pressure of ambient air outside the nozzle to draw said ambient air into the exhaust gas flowpath, and a valve means to controllably flow said ambient air into the exhaust gas flowpath when said static pressures are below said ambient pressure said valve means including a valve opening means to open said valve by a radial pressure gradient across the divergent flaps and seals.

2. A cooling system as claimed in claim 1 wherein said area ratio control means comprises a variable exit area control means to vary said exit area.

3. A cooling system as claimed in claim 2 wherein said area ratio control means further comprises a variable throat area control means to vary said throat area.

4. A cooling system as claimed in claim 3 wherein said valve means comprises flapper valves sealingly disposed over cooling apertures through at least one of said divergent seals.

5. A cooling system for cooling interior hot surfaces of longitudinally extending and circumferential adjacent divergent seals and flaps bounding a hot exhaust gas flowpath in a divergent section of an aircraft gas turbine engine exhaust nozzle, said cooling system comprising:

a nozzle throat area and nozzle exit area of the nozzle, an area ratio control means to chance a ratio of said nozzle exit area to said nozzle throat area to an overexpanded level that reduces static pressures along at least a longitudinally extending portion of said surfaces to below ambient pressure of ambient air outside the nozzle to draw said ambient air into the exhaust gas flowpath, said area ratio control means comprising a variable exit area control means to vary said exit area and a variable throat area control means to vary said throat area, and a value means to controllably flow said ambient air into the exhaust gas flow path when said static pressures are below said ambient pressure, wherein said valve means comprises a gap means to controllably open gaps between said circumferentially adjacent divergent flaps and seals.

6. A cooling system as claimed in claim 5 wherein said gap means comprises a spring loaded divergent seal retainer 7. A cooling system as claimed in claim 6 wherein said spring loaded divergent seal retainer comprises;

a retaining apparatus for providing retention between adjacent longitudinally extending seals and flaps in the aircraft gas turbine engine exhaust nozzle, said seal retaining apparatus comprising;

a pivotable bar having two arms with lug ends and pivotably supported on a post on a back of the seal, and a compressive spring means operably disposed between said bar and said post so as to place the seals in compressive sealing engagement with adjacent ones of the flaps.

8. A cooling system as claimed in claim 6 wherein said spring loaded divergent seal retainer comprises;

a retaining apparatus for providing retention between adjacent longitudinally extending seals and flaps in the aircraft gas turbine engine exhaust nozzle, said seal retaining apparatus comprising;

a pivotable bar having two arms with lug ends and pivotably and slideably supported on a post on a back of the seal, a compressive spring means operably disposed between said bar and post so as to place the seals in compressive sealing engagement with adjacent ones of the flaps, each of said lug ends supporting a retaining lug within a channel having transversely extending channel walls mounted on the flap, and said retaining lug supported from said bar is movably disposed within said channel to provide said retaining lug with a two degree freedom of motion relative to the flap within said channel.

9. A cooling system as claimed in claim 6 wherein said spring loaded divergent seal retainer comprises;

a retaining apparatus for providing retention between adjacent longitudinally extending seals and flaps in the aircraft gas turbine engine exhaust nozzle, said seal retaining apparatus comprising;

a pivotable bar having two arms with lug ends and pivotably supported on a post on a back of the seal, each of said lug ends supporting a retaining lug within a channel having transversely extending channel walls mounted on the flap, said retaining lug is mounted on an end of a shaft which is slideably disposed and retained within a hole in said bar, a compressive coil spring operably disposed around said shaft between said lug and bar so as to place the seals in compressive sealing engagement with adjacent ones of the flaps, and said retaining lug is movably disposed within said channel to provide said retaining lug with a two degree freedom of motion relative to the flap within said channel.

11. A cooling system as claimed in claim 6 wherein said spring loaded divergent seal retainer comprises;

a retaining apparatus for providing retention, between adjacent longitudinally extending seals and flaps in the aircraft gas turbine engine exhaust nozzle, said seal retaining apparatus comprising;

a compressive leaf spring having two arms with lug ends and supported on a post on a back of the seal, and said compressive leaf spring operably disposed between said bar and said post so as to place the seals in compressive sealing engagement with adjacent ones of the flaps, each of said lug ends supporting a retaining lug within a channel having transversely extending channel walls mounted on the flap, and said retaining lug supported from said bar is movably disposed within said channel to provide said retaining lug with a two degree freedom of motion relative to the flap within said channel.

12. A method for cooling interior hot surfaces of longitudinally extending and circumferentially adjacent divergent seals and flaps bounding a hot exhaust gas flowpath and the exhaust flow in a divergent section of an aircraft gas turbine engine exhaust nozzle, said method comprising setting the ratio of the nozzle's exit area to throat area to an overexpanded level that reduces static pressures along at least a longitudinally extending portion of the surfaces to below ambient pressure of ambient air outside the nozzle, opening a valve with a radial pressure gradient across the divergent flaps and seals, and flowing the ambient air through the valve and into the exhaust gas flowpath where the static pressures are below the ambient pressure.

13. A method as claimed in claim 12 wherein setting the ratio of the nozzle's exit area to throat area comprises setting a variable exit area.

14. A method as claimed in claim 12 wherein setting the ratio of the nozzle's exit area to throat area comprises setting a variable throat area.

15. A method as claimed in claim 12 wherein setting the ratio of the nozzle's exit area to throat area comprises setting a variable exit area and a variable throat area.

16. A method for cooling interior hot surfaces of longitudinally extending and circumferentially adjacent divergent seals and flaps bounding a hot exhaust gas flowpath and the exhaust flow in a divergent section of an aircraft gas turbine engine exhaust nozzle, said method comprising setting the ratio of the nozzle's exit area to throat area to an overexpanded level that reduces static pressures along at least a longitudinally extending portion of the surfaces to below ambient air into the exhaust gas flowpath where the static pressures are below the ambient pressure by opening a gap between adjacent divergent flaps and seals which are otherwise normally disposed in overlapping sealing relationship about the unvectored nozzle centerline which coincides with engine centerline.

17. A method as claimed in claim 16 wherein the step of opening a gap comprises overexpanding the divergent section of the nozzle sufficiently to produce static pressures that cause a gap between the seals and flaps by overcoming the spring force of spring loaded divergent seal retainers that provide retention between the adjacent seals and flaps.

\* \* \* \* \*